United States Patent [19]

Kenney et al.

[11] Patent Number: 5,725,928
[45] Date of Patent: Mar. 10, 1998

[54] TOUCH FASTENER WITH MAGNETIC ATTRACTANT

[75] Inventors: Randall B. Kenney, Concord, N.H.; Brian J. Routhier, Leesburg, Va.; Martin L. Jacobs, Bedford, N.H.

[73] Assignee: Velcro Industries B.V., Curacao, Netherlands Antilles

[21] Appl. No.: 390,876

[22] Filed: Feb. 17, 1995

[51] Int. Cl.⁶ .................................... A44B 21/00
[52] U.S. Cl. ............. 428/100; 428/99; 428/120; 428/900; 24/451; 24/452
[58] Field of Search ............. 428/99, 100, 900, 428/120; 24/444, 451, 452

[56] References Cited

U.S. PATENT DOCUMENTS

| | | | |
|---|---|---|---|
| 3,191,106 | 6/1965 | Baermann | 317/201 |
| 3,248,758 | 5/1966 | Schmitz et al. | 18/42 |
| 3,326,399 | 6/1967 | Ausnit | 215/3 |
| 3,417,675 | 12/1968 | Ausnit | 93/35 |
| 3,870,741 | 3/1975 | Kuhn | 246/46.4 |
| 4,180,890 | 1/1980 | Brumlik | 24/204 |
| 4,198,734 | 4/1980 | Brumlik | 24/204 |
| 4,441,875 | 4/1984 | Saito et al. | 425/3 |
| 4,470,857 | 9/1984 | Casalou | 156/66 |
| 4,563,380 | 1/1986 | Black et al. | 428/100 |
| 4,617,214 | 10/1986 | Billarant | 428/40 |
| 4,667,447 | 5/1987 | Barton | 51/362 |
| 4,673,542 | 6/1987 | Wigner et al. | 264/46.7 |
| 4,693,921 | 9/1987 | Billarant et al. | 428/100 |
| 4,710,414 | 12/1987 | Northrup et al. | 428/43 |
| 4,726,975 | 2/1988 | Hatch | 428/100 |
| 4,784,890 | 11/1988 | Black | 428/100 |
| 4,792,111 | 12/1988 | Taguchi | 249/83 |

(List continued on next page.)

FOREIGN PATENT DOCUMENTS

| | | |
|---|---|---|
| 0 168 241 A2 | 1/1986 | European Pat. Off. . |
| 0 250 175 A2 | 12/1987 | European Pat. Off. . |
| 0 439 969 A1 | 8/1991 | European Pat. Off. . |
| 0 621 118 A1 | 10/1994 | European Pat. Off. . |
| 0612118A1 | 10/1994 | European Pat. Off. . |
| 2047243 | 3/1971 | France . |
| 62-1163019 | 12/1987 | Japan . |

OTHER PUBLICATIONS

"Fatigue–Resistant Metal Hook–and–Loop Fastener," NASA Tech Briefs, Jun. 1994.

"Hook–and–Loop Metal Fastener," NASA Tech Briefs, Jun. 1994. (On Same Page as 1).

*Primary Examiner*—Alexander Thomas
*Attorney, Agent, or Firm*—Steven J. Weissburg

[57] ABSTRACT

A fastening component of a separable fastener has some portion that is necessary for its fastening function, such as the hooks, the base to which the hooks are attached or a substrate that is used for another purpose, comprised of a magnetically attractive constituent. Another portion of the fastening component is comprised of a magnetically inert constituent. The fastening element may be the hook portion or the loop portion of a typical fastener. The fastening elements and the base may be unitary, or of different precursors, such as in a woven fastener component. The magnetically inert constituent may comprise a polymeric plastic or a thermoplastic elastomer. The magnetic attractant may impregnate the magnetically inert constituent, or it may coat or be coated by the magnetically inert constituent. The magnetic attractant may comprise a metal powder. The metal may be selected from the group consisting of iron powder. The magnetic attractant may be an organo-iron or a rare earth metal. In a woven fastener, either the base structure or the hooks may include the magnetic attractant, or both may do so. The material that forms the hooks may be entirely of a magnetically attractive material, with the material that forms the woven base being magnetically inert. Rather than the magnetically attractive material being incorporated into the fastening elements or the base, it may be incorporated into the substrate that is formed from a precursor element that is separate from the base, and that is joined to the base.

32 Claims, 7 Drawing Sheets

U.S. PATENT DOCUMENTS

| | | | |
|---|---|---|---|
| 4,802,939 | 2/1989 | Billarant et al. | 156/155 |
| 4,814,036 | 3/1989 | Hatch | 156/245 |
| 4,842,916 | 6/1989 | Ogawa et al. | 428/100 |
| 4,881,997 | 11/1989 | Hatch | 156/66 |
| 4,929,294 | 5/1990 | Blome | 156/187 |
| 4,931,344 | 6/1990 | Ogawa et al. | 428/100 |
| 4,933,035 | 6/1990 | Billarant et al. | 156/155 |
| 4,933,224 | 6/1990 | Hatch | 428/100 |
| 4,941,236 | 7/1990 | Sherman et al. | 24/303 |
| 4,961,894 | 10/1990 | Yabe et al. | 264/259 |
| 5,061,540 | 10/1991 | Cripps et al. | 428/100 |
| 5,110,649 | 5/1992 | Morse et al. | 428/100 |
| 5,135,375 | 8/1992 | Matsuo et al. | 425/3 |
| 5,171,395 | 12/1992 | Gilcreast | 156/500 |
| 5,180,618 | 1/1993 | Kessler et al. | 428/100 |
| 5,218,759 | 6/1993 | Juskey et al. | 29/840 |
| 5,259,905 | 11/1993 | Gilcreast | 156/250 |
| 5,260,015 | 11/1993 | Kennedy et al. | 264/167 |
| 5,286,431 | 2/1994 | Banfield et al. | 264/134 |
| 5,422,156 | 6/1995 | Billarant et al. | 428/100 |
| 5,500,268 | 3/1996 | Billarant | 428/100 |

5,725,928

TOUCH FASTENER WITH MAGNETIC ATTRACTANT

BACKGROUND

The present invention relates to touch fasteners in general, and more specifically, to touch fasteners for incorporation by molding into molded articles.

Hook and loop type separable touch fasteners, such as those sold by the assignee of this application under the trademark Velcro, are well-known and are used to join two members detachably to each other. This type of fastener has two components. Each has a flexible substrate material having one component of the fastening system on a fastening surface thereof. One component is typically comprised of resilient hooks while the other is comprised of loops, and when the two surfaces are pressed together they interlock to form a releasable engagement.

Separable fasteners are used in the manufacture of automobile seats in the attachment of an upholstered seat cover to a polyurethane foam bun. One portion of the separable fastener is incorporated onto the surface of the polyurethane foam bun during the foam molding process. The mating portion of the separable fastener is attached to the seat cover to provide releasable attachment to the foam bun. The separable fastener assembly used in the foam mold for incorporation in the bun surface typically comprises the hooked portion of a separable fastener. This hook portion is characterized by a base carrying resilient hooks on a fastening surface. The opposite, non-fastening surface of the base may carry anchor projections to become incorporated into the foam to provide stable attachment of the separable fastener assembly to the foam article. It is also common for a backing layer or substrate to mate with the nonfastening face of the base. The substrate may be of a material that is more conducive to handling, of the component or its adherence to other articles. Anchor projections may also project from the substrate. Further, other components can be sandwiched between the substrate and the base.

A protective layer, such as a thin plastic film, may be placed over the resilient hooks, to prevent incursion of foam into the hooks during the molding process, since significant foam contamination of the hooks would affect their ability to engage with the mating portion of the fastener attached to the seat cover. Alternatively, an elastomeric cover that intimately surrounds the hooks, except for a small portion at their tips, can also be used. After the molded article is fabricated and removed from the mold, the elastomeric material is removed.

In some assemblies, a magnetically attractive shim is attached to the base to facilitate placement of the assembly in a valley (also known as a trench or trough) of the mold cavity wall, which is equipped with magnets. The shim also helps secure the hook-carrying face of the component tightly against the mold wall, thereby further minimizing incursion of the foam into the hooks. The assemblies may be referred to as "mold-in" fasteners or assemblies, due to their use in such molded products.

The shim can be incorporated into different locations in the assembly. It can be sandwiched between the hook carrying base and a substrate or backing layer, either temporary or permanent. It can be located centrally relative to the width of the hook-carrying base, or along its marginal edges. In cases where a thin plastic film is used to cover the hooks, the shim can be sandwiched between the plastic sheet and the hooks.

As mentioned above, it is also known to substantially cover the hook region with an elastomeric material that protects the hooks against incursion of the foam. It is known to include a magnetic attractant in this elastomeric material.

Known methods of adhering the protective film cover to the hook-carrying component include to use a long bead of hot melt adhesive there between. It is also known to include a magnetic attractant in this hot melt material.

The known methods all have drawbacks. With regard to the metal shim itself, it presents an extra component and an extra manufacturing step, thereby contributing to the cost of the assembly and the time for manufacturing a given length of material. The metal shim also contributes to the weight of the material. In the construction process, care must be taken that workers are not cut by the metal strips. The metal limits the flexibility of the strip, and consideration must be taken of the thermal expansion and contraction properties of the various binders and additional layers that might be used to secure the strip to the substrate. The metal strip also curls and bows and generally makes handling the component unwieldy.

Considering those known assemblies that use either the protective plastic or the elastomeric cover to contain the metal shim, or a magnetic attractant, there are reasons to eliminate these protective covers, if possible. The protective covers also entail additional steps, in their manufacture, attachment to the fastener assembly, and removal from the fastener assembly after molding. All protective material must be removed from the hooks (or loops, if it be the loop carrying component molded into the article), or else the hooks (or loops) will not be exposed to fasten to the mating component. These extra steps must typically be conducted away from a normal high speed production line and contribute to the cost of the fastener assembly, the time for its manufacture, and also generate a relatively large volume of essentially waste material. Additionally, sometimes a residue from the cover material remains on the fastening component after removal, which is undesirable.

Thus, there is a great need for a touch fastener assembly that can be molded into a molded product, without the use of metal shims or protective covering for the fastener components. There is also a need to simplify the manufacture of such mold-in assemblies, to minimize their cost, production time, and the time to prepare the molded product for use. It is thus an object of the invention to facilitate a simple means for providing a magnetic attractability to the mold-in fastener assembly. It is another object of the invention to provide a light weight mold-in assembly that does not require a metal shim or protective covering for the fastener components, such as hooks.

SUMMARY

A preferred embodiment of the invention is a fastening component of a separable fastener, where some portion of the fastening component that is absolutely necessary for its fastening function, such as the hooks, the base to which the hooks are attached or a substrate that is used for another purpose, is comprised of a magnetically attractive constituent, and where another portion of the fastening component is comprised of a magnetically inert constituent. Either the hook portion or the loop portion of a typical fastener may include the magnetically attractive constituent.

A preferred embodiment of the invention is thus a component of a two component separable fastener, said component comprising a base; and carried on said base, a plurality of fastening elements; wherein at least one of said base and said fastening elements comprise a magnetically inert constituent that is intimately associated with a magnetic attractant constituent. The fastening elements and the base may be unitary, such as in the case of an extruded component, or they may be of different precursors, such as in the case of a woven fastener component.

The magnetically inert constituent may comprise a polymeric plastic or a thermoplastic elastomer, including but not limited to polypropylene, polyethylene, polyamide, polyester, polystyrene, polyvinyl chloride, acetal, acrylic, polycarbonate, polyphenylene oxide, polyurethane and polysulfone.

The magnetic attractant may impregnate the magnetically inert constituent, or it may coat or be coated by the magnetically inert constituent.

The fastening elements may comprise hook-like elements or loop-like elements.

The magnetic attractant may comprise a metal powder. The metal may be selected from the group consisting of iron powder, magnetite iron oxide, hematite iron oxide, iron (II) oxide, iron (III) oxide, iron (III) stearate. The magnetic attractant may also be an organo-iron compound or a rare earth metal.

In the case of a woven fastener, either the base structure or the hooks may include the magnetic attractant, or both may do so. Further, the material that forms the hooks may be entirely of a magnetically attractive material, with the material that forms the woven base may be magnetically inert.

The fastener may also include a substrate, that is formed from a precursor element that is separate from said base, and that is joined to said base. The fastening elements and the substrate may be coextruded or formed separately and laminated together. The substrate may be of a woven, non-woven, paper or foam material.

The fastening elements may comprise polymeric monofilaments.

Another preferred embodiment of the invention is a molded article comprising a body molded from a molding material, said body having at least one surface and an interior body region, fixed to said surface of said molded body, a separable fastener component for use with a complementary separable fastener component, said separable fastener component being according to any of the variations described above.

Another preferred embodiment of the invention is a component of a two component separable fastener, the component comprising a base and carried on the base, a plurality of fastening elements and, joined to the base, a substrate, where the substrate comprises a magnetically inert constituent that is intimately associated with a magnetic attractant constituent.

The magnetically inert constituent may be as described above, with respect to the embodiment where the magnetic attractant is associated with either the fastening elements or the base. The magnetically attractive constituent may also be any of the magnetically attractive materials identified above.

Yet another preferred embodiment of the invention is a method of making a component of a two component separable fastener, the method comprising the steps of providing a magnetic attractant and associating said magnetic attractant with at least one of a base and a plurality of fastening elements carried on said base; wherein at least one of said base and said fastening elements comprise a magnetically inert constituent that is intimately associated with said magnetic attractant.

The magnetic attractant may be associated with the base only, or the fastening elements only, or both. A polymeric plastic resin may be mixed with a magnetic attractant such as identified above. The polymeric plastic resin may be such as is identified above.

According to still another preferred embodiment, the invention is a method for making a molded article, said method comprising the steps of making a component of a two component separable fastener, such as identified above, having a magnetic attractant intimately associated therewith, according to the methods identified above. The fastening component is then placed into a mold, with its fastening face facing a wall of said mold, said mold comprising: a fastening element receiving valley region and a magnet inside a mold wall adjacent said fastening element receiving valley, whereby said magnet attracts said fastener component toward said mold wall. Molding material is provided to said mold to mold the product with the fastening component incorporated therein.

BRIEF DESCRIPTION OF THE DRAWINGS

These and other features, aspects, and advantages of the present invention will become better understood with regard to the following description, appended claims and accompanying drawings, where:

DETAILED DESCRIPTION

Figure 1:
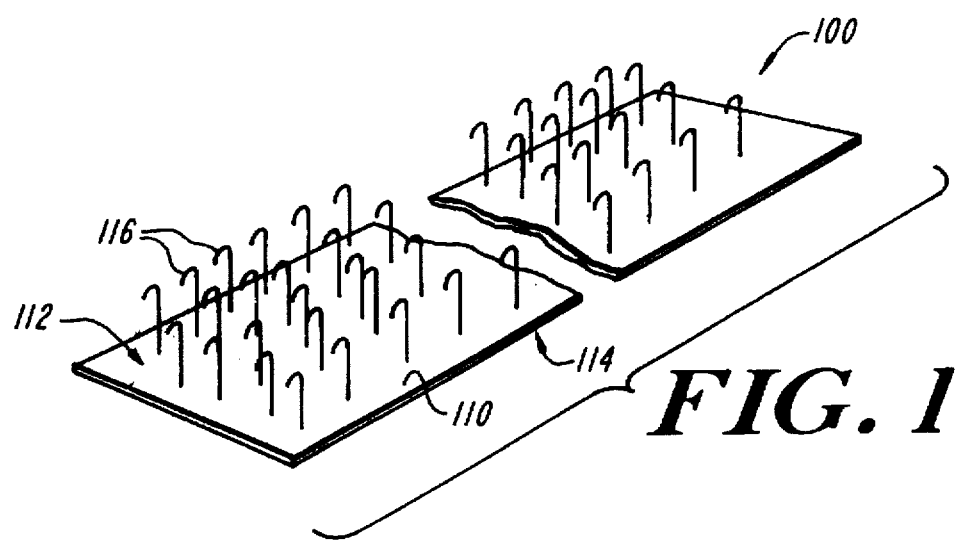
FIG. 1 is a schematic perspective view of a fastening component of the invention, where the fastening elements are hook-type elements.

A fastening component 100 of the invention is shown schematically with reference to FIG. 1. A base 110 has two surfaces: a fastening surface 112 and a non-fastening surface 114. The base may be woven, non-woven, plastic, fabric or any other suitable structure or material. The invention is not limited to the mechanical form of the base, and any known mechanical form of base for separable touch-type fasteners is believed to be consistent with the invention. Often, the base is a plastic base and it is attached to a separate substrate of a different material. If the base is a woven structure, the base portion may be referred to as a "ground fabric."

The base presents on its fastening surface 112, a plurality of hook-type elements 116. The hook-type elements may be shaped as hooks, or mushrooms or two tined anchors, or any other mechanical form of hook-type element used for separable touch-type fasteners, which engage loop-type elements, as is known in the art. Such elements are referred to herein as "hook-type", or "hook-like" or "hook" elements, whether or not they are in the shape of hooks. Any known mechanical form, and any as yet unknown mechanical form of hook elements is believed to be consistent with the invention.

Figure 2:
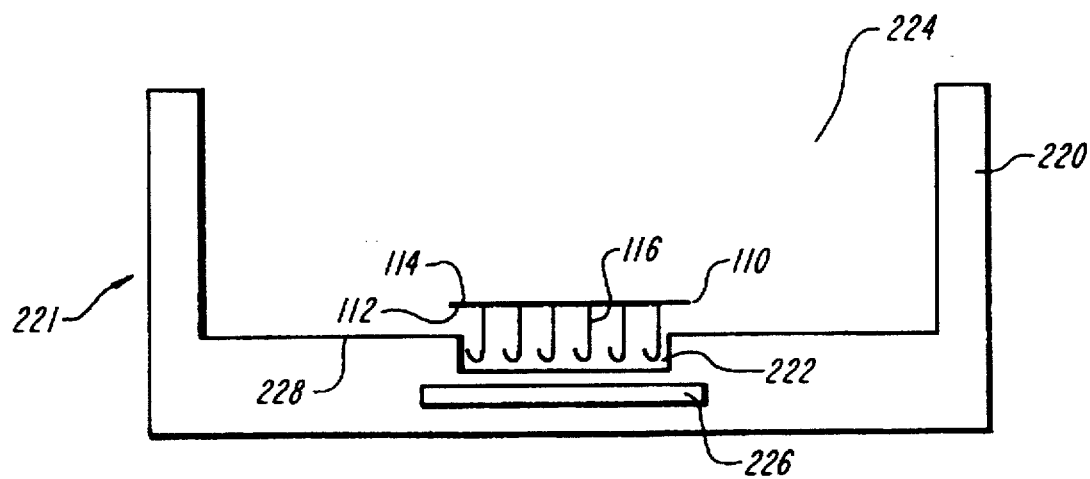
FIG. 2 is a cross-sectional side view of a mold for use with the invention, having a cavity for insertion of the fastening component and a magnet within the mold walls, also showing a fastening component of the invention in place in the mold for molding.
Figure 3:
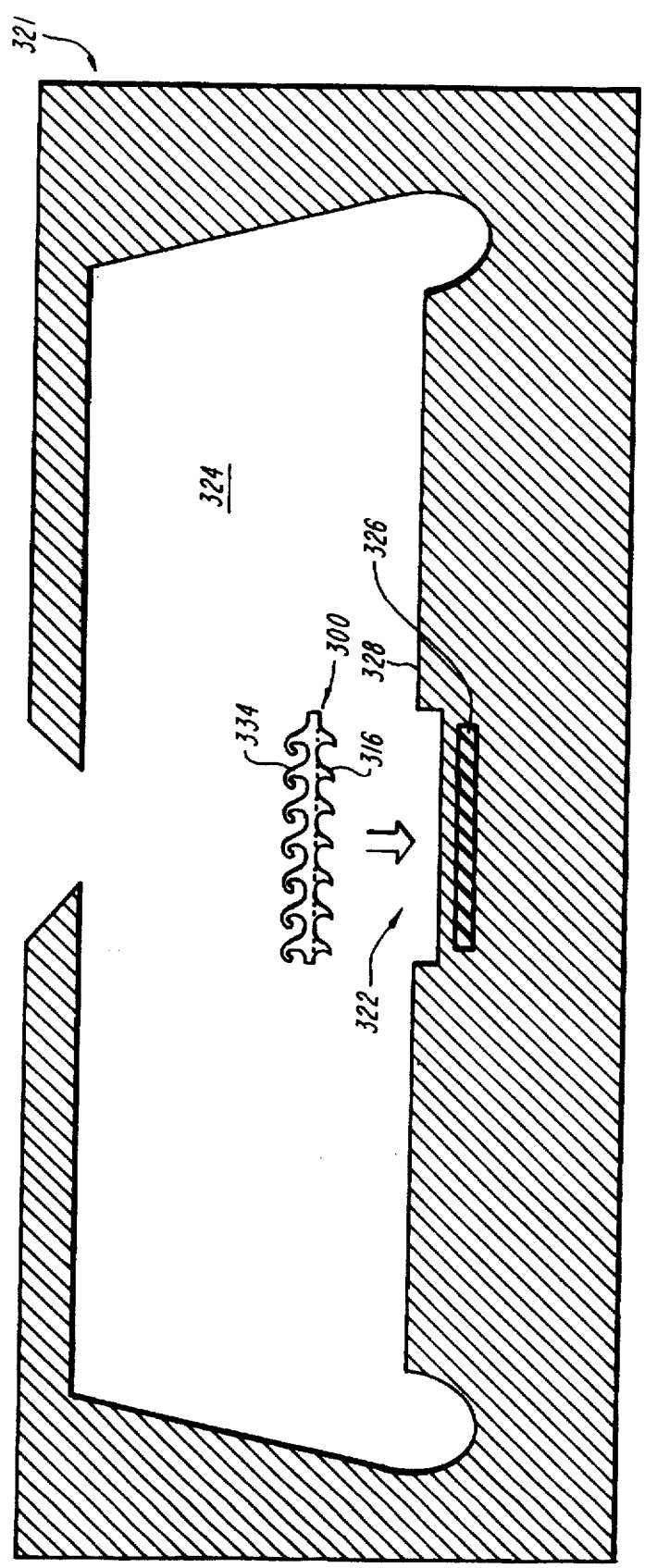
FIG. 3 is a cross-sectional view similar to that shown in FIG. 2, where the mold-in product has hooks and anchors back-to-back.

According to the present invention, either the fastening elements 116 (hooks, as shown in the figure) or the base 110, or both, include a magnetically attractive constituent. As shown in FIG. 2, the fastening component 100 is used in a mold 221, having a main mold wall 220 surrounding a main cavity 224. A fastening element-receiving mold valley 222 is in the bottom wall 228 of the mold. Embedded in the bottom wall 228 is a magnet 226, such as is known in the art.

The fastening component 100 is inserted into the mold, adjacent the fastening element-receiving valley 222, with the hooks 116 facing into the valley 222. The magnet 226 attracts the fastening component 100 toward the bottom mold wall 228, due to the magnetically attractive material contained in the fastening component 100. The magnetic attraction secures the fastening component to the mold wall, thereby preventing the incursion of the molding material among the fastening elements.

In addition to the magnetic attractant, other techniques can and are typically used to prevent the fouling of the fastening elements with the molding material. Any such structures known to the art, and any such structures yet to be developed, are believed to be consistent with the invention. For instance, a film strip can completely cover the fastening elements, such as is shown in U.S. Pat. No. 4,693,921, issued in 1987 to Billarant, entitled FASTENING TAPE DESIGNED TO BE ATTACHED TO A MOLDED ARTICLE DURING MOLDING, AND ITS ATTACHING METHOD. Rather than covering the entire surface of the fastening elements, strips of film can border the fastening element region, forming gaskets to prevent the incursion of film. Such film regions are shown in U.S. Pat. No. 4,726,975, issued in 1988 to Hatch, entitled METHOD AND APPARATUS FOR ADAPTING SEPARABLE FASTENERS FOR ATTACHMENT TO OTHER OBJECTS. Also possible is to use an elastomeric covering that intimately (either completely, or partially) surrounds the fastening elements, such as is described in U.S. Pat. No. 5,286,431 (for fully surrounding), issued to Banfield et al. in 1994, entitled MOLDED PRODUCT HAVING INSERT MOLD-IN FASTENER or, (for partially surrounding) as shown in PCT application No. PCT/US94/07473 for HOOK AND LOOP TYPE INSERT USED IN MOLDING PROCESS, published Jan. 19, 1995, corresponding to U.S. patent application Ser. No. 08/087,917, filed on Jul. 6, 1993, entitled DIE CUT MOLD-IN. All of the foregoing patents and applications are hereby incorporated herein by reference.

Another possibility is to use a fastening component, for instance having hook-type fastening elements, that has a pattern of hooks with a main central region, circumscribed by a bald region that is substantially free of hooks, which is itself circumscribed by a perimeter region of hooks. The fastening element is used with a mold having a central valley, surrounded by a perimeter land, which is in turn typically surrounded by a perimeter valley. The perimeter valley mates with the perimeter region of hooks; the land mates with the bald region; and the central mold valley mates with the central main region of hooks. The perimeter region of hooks may be partially fouled by the incursion of foam material, however, the main, central region of hooks is not fouled, being protected by the "sacrificial" perimeter hooks. Such an arrangement is described in co-pending, co-assigned U.S. Ser. No. 08/391/695, filed of even date herewith, in the names of Brian J. Routhier, Martin I. Jacobs and George A. Provost, entitled SEPARABLE FASTENER HAVING A BALD PERIMETER RIB BOUNDED BY FASTENING ELEMENTS, which is incorporated fully herein by reference.

The molding process is shown schematically in FIGS. 3, 4, 5 and 6, for incorporating an embodiment of the fastener of the invention that is a back-to-back hook and anchor fastener into a molded product. The fastener component 300 is inserted into the main cavity 324 of the mold 321, with its fastening elements 316 facing the fastening element receiving valley 322 and its anchoring elements 334 facing the central region of the main mold cavity 324. The magnet 326 attracts the fastening component 300 toward the magnet 326, thereby enhancing the sealing of the fastening component to the mold wall 328. This helps to prevent fouling of the hook components 316 during the molding process.

Figure 4:
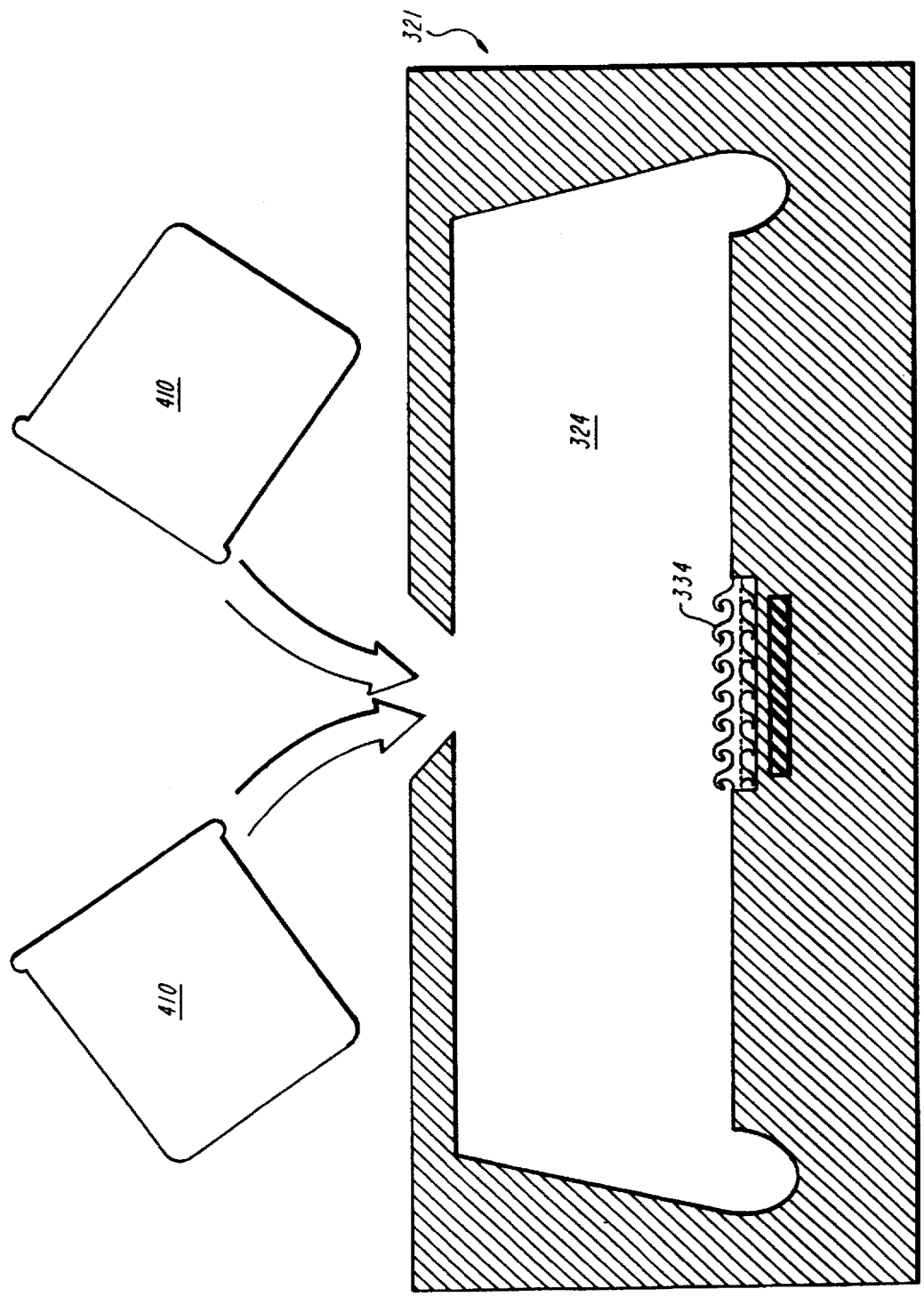
FIG. 4 shows, schematically, the mold of FIG. 3, with molding material being poured into the mold.

The next step in the molding process is shown schematically in FIG. 4, where the molding material 410 is introduced into the mold. The molding material may constitute a single component, or there may be multiple components that are mixed as they are introduced into the mold, or before.

Figure 5:
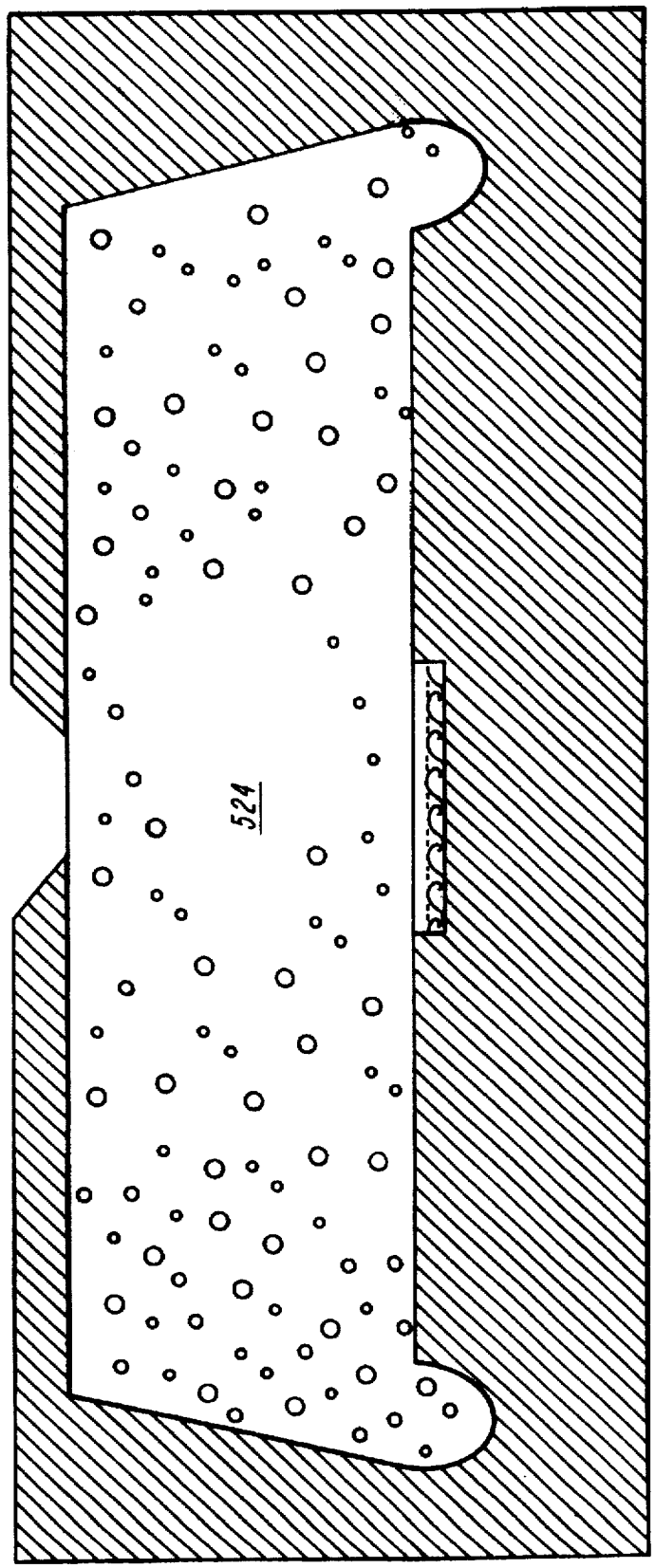
FIG. 5 shows, schematically, the molding material curing in the mold shown in FIG. 4.
Figure 6:
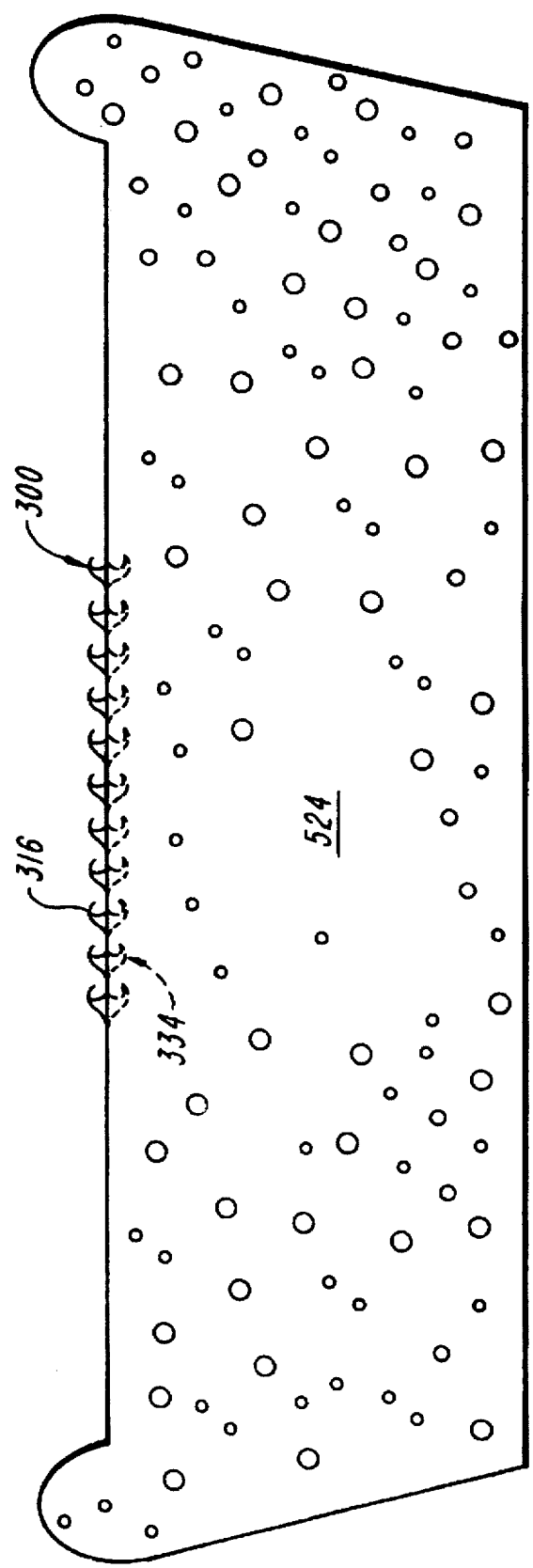
FIG. 6 shows, schematically, a molded product including a fastening component of the invention, either a single sided fastener, or an anchored back-to-back fastening component.

The article being formed 524 is shown schematically in FIG. 5. The anchor elements 334 are surrounded by the molding material, thereby embedding the fastening component into the molded article. It is not necessary that anchoring elements be used, and there are many ways known to the art that do not use them. FIG. 5 is intended to show both anchored and unanchored embodiments. A molded article 524 incorporating the magnetically attractive fastening component 300 with exposed hook components 316 is shown schematically in FIG. 6. The optional anchoring elements 334 are shown in phantom, embedded in the molded material. A typical type of molded article is a foam seat cushion, such as for an automobile or airplane. Rather than foam, other types of molded materials are also suitable.

In a typical embodiment of the invention, the hook elements 116 and the base 110 are molded unitarily from the same precursor element as one mechanical element, and are thus composed of the same material. Suitable such materials include: polymeric plastics such as: polypropylene, polyethylene, polyamide, polyester, polystyrene, polyvinyl chloride, acetal, acrylic, polycarbonate, polyphenylene oxide, polyurethane, polysulfone, and thermoplastic elastomers. Suitable magnetic attractants include: all ferromagnetic materials, such as iron (powder), iron oxide (various forms, including magnetite, hematite, iron (II) oxide, iron (III) oxide), iron (III) stearate (and various organo-iron compounds), rare earth metals and their compounds.

Figure 7:
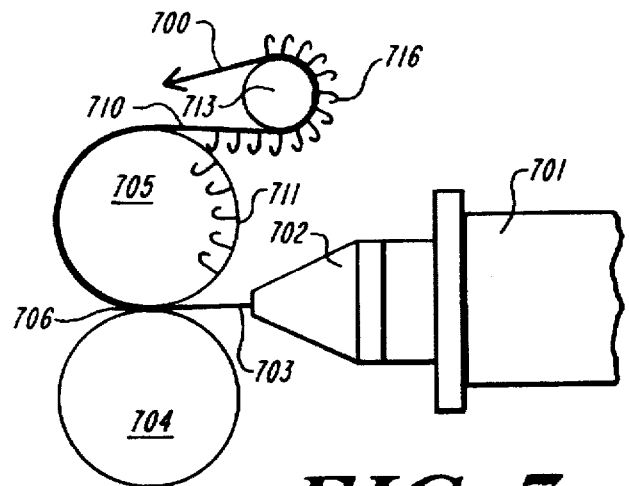
FIG. 7 shows schematically an apparatus and process for manufacturing an embodiment of the fastener component of the invention, having a unitary molded base carrying hooks on one surface thereof.

An apparatus for molding a fastening component having unitarily molded fastening elements and base is shown schematically in FIG. 7. This apparatus is of the type shown generally in U.S. Pat. Nos.: 4,794,028, entitled METHOD FOR CONTINUOUSLY PRODUCING A MULTI-HOOK FASTENER MEMBER AND PRODUCT OF THE METHOD, issued in 1988 to Fischer; 4,872,243, entitled MULTI-HOOK FASTENER MEMBER, issued in 1989 also to Fischer; and 4,775,310, entitled APPARATUS FOR MAKING A SEPARABLE FASTENER issued in 1988 also to Fischer. All three patents are incorporated herein by reference. An extruder barrel 701 melts and forces molten plastic 703 through a die 702, into the nip 706 between a base roller 704 and a cavity roller 705, that contains cavities 711 to form the hooks 716 of a strip fastener 700, which extend from a web-like base 710 composed of the same material as is the hooks 716. The strip fastener material formed at the nip 706 travels around the periphery of the cavity roller 705 and around the stripping roller 713, which assists in pulling the formed hook sheet from engagement with the cavity roll 705. The strip is then passed to a wind-up roll, not shown.

EXAMPLES

In a first example, molded hooks, of the type known as Velcro Ultra 8 brand hooks sold by Velcro Group corporation of Manchester, N.H., were molded using the unitary continuous forming method, such as shown in FIG. 7, also described in the above cited U.S. Pat. Nos. 4,794,028, 4,872,243 and 4,775,310 to Fischer. The material provided to the extruder was 40% (all percentages are by weight) Impet brand (polyethylene terephthalate PET) resin premixed with ferro-magnetic filler, sold by the Hoechst Celanese Company of Chatham, NJ., grade EKX - 155, blended with60% Vandar brand (polybutylene terephthalate PBT) resin also sold by Hoechst grade MB90011A1. The processing temperatures ranged from 530° F. in the feed section of the extruder to 570° F. at the die. The temperature of the base roll was 104° F., the cavity roll 191° F. and the stripping roll was 83° F.

In a second example, molded hooks, of the same type, were again molded using the unitary continuous forming method such as shown in FIG. 7. The material provided to the extruder was 40% Celcon brand (acetal) resin with ferro-magnetic filler, sold by the Hoechst, grade MM3.5H blended with 60% Celcon brand (acetal) resin also sold by Hoechst, grade TX90 PLUS. The processing temperatures ranged from 360° F. in the feed section of the extruder to 375° F. at the die. The temperature of the base roll was 105° F., the cavity roll 195° F. and the stripping roll was 85° F.

It is also possible, as is well known, for the hook elements to be unitarily molded with a base and for a web-like substrate to be manufactured from separate mechanical precursor elements, which are subsequently or simultaneously joined. For instance, the hook elements with base and the substrate can be co-extruded according to any known method; such as by a cross-head die or by calendaring two separate extrusion streams together. In such a case, either the hooks with base, or the substrate alone, or both together can include the magnetic attractant. They may be of identical materials, or different.

Figure 8:
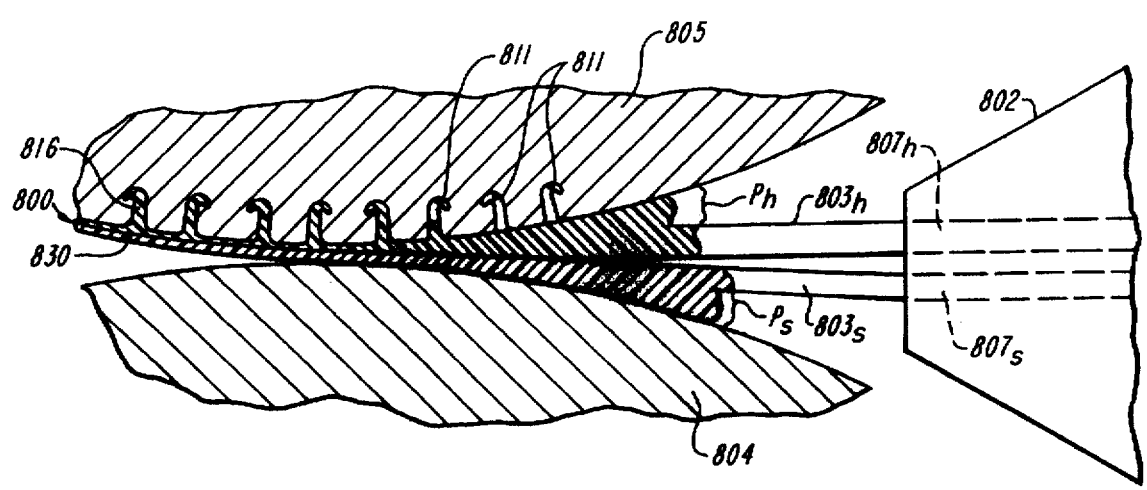
FIG. 8 shows schematically an apparatus and process for manufacturing an embodiment of the fastener component of the invention, having a substrate and hooks which are coextruded and then laminated together.

An apparatus for molding a fastening component having coextruded fastening elements with a base and a substrate is shown schematically in FIG. 8. This apparatus is similar to that shown above with reference to FIG. 7, but uses a cross-head die. Molten plastic 803h (for hooks and base) and 803s (for substrate) is forced through a cross-head coextrusion die head 802, with two different die orifices 807h and 807s. The two streams of molten plastic are forced into the nip 806 between a base roller 804 and a cavity roller 805, that contains cavities 811 to form the hooks 816 of a strip fastener 800. A pool of hot hook material $P_h$ forms upstream of the nip, as well as a pool of hot second substrate material $P_s$. At the nip, the hook material is forced into the cavities 811 in the hook roller 805. Simultaneously, the substrate material is flattened and spread into a web shape, along with a quantity of the hook material (which forms a base unitarily with the hooks being formed). The pressure in the nip joins the hook material and base, on the one hand, with the substrate material, on the other hand such that the hooks 816 and the substrate 830 are formed, and joined to become the fastener component 800. This coextruded component travels around the hook roller 805, and is stripped therefrom in the same manner as is a simple extruded unitary hook and base component, shown in FIG. 7. The strip is then passed to a wind-up roll, not shown.

Rather than a single sided hook component, as shown in FIG. 8, a back-to-back hook and anchor fastening component can be coextruded as shown in FIG. 8, with the anchor material being in place of the substrate material. In such a case, the base roller 804 includes anchor cavities around its periphery. An apparatus for making such a structure is shown in U.S. patent application Ser. No. 381,632, filed on Jan. 31, 1995, entitled BACK-TO-BACK HOOK FASTENER, which is a divisional application off U.S. patent application Ser. No. 92,312, filed on Jul. 14, 1993, and in a corresponding published PCT application, PCT/ US94/07556, filed on Jul. 6, 1994 and published on Jan. 19, 1995 all of which are assigned to the assignee hereof, and all of which are incorporated herein by reference.

Figure 9:
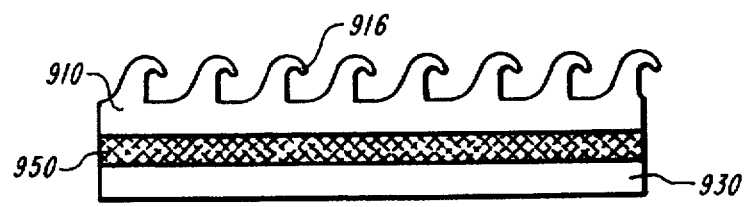
FIG. 9 shows schematically a fastening component of the invention having a unitary molded base carrying hooks on one surface thereof, laminated with a separate substrate.

An article that could have been made with the equipment shown in FIG. 8 is shown schematically in FIG. 9. The hooks 916 are composed of a first material. A base 910 is unitary with the hooks, having been extruded therewith. The substrate 930 is composed of the same material, or a second, different material. The joining region, which may take many different physical forms, exhibits a transition from the hook material to the substrate material.

The substrate may be a woven or a non woven fabric.

It has already been discussed to use a unitary extrusion from which are molded hooks and a unitary base, as well as a coextrusion, which joins a base with hooks to a substrate. Other methods may be used for joining hooks to a substrate. Another method is to laminate an already formed substrate to a unitary hook and base, as the hook carrying web is being extruded and formed. This technique is described generally in U.S. Pat. No. 5,260,015, issued Nov. 9, 1993, entitled METHOD FOR MAKING A LAMINATED HOOK FASTENER, in the name of William J. Kennedy et al., which is incorporated herein by reference. This method may be referred to as the "one-wrap" method. The apparatus for implementing the method is shown schematically in FIG. 10. As with the embodiment shown in FIG. 7, an extruder barrel 1001 melts and forces molten plastic 1003 through a die 1002, into the nip 1006 between a base roller 1004 and a cavity roller 1005, that contains cavities 1011 to form the hooks 1016 of a strip fastener 1000, which extend from a web-like base 1010 composed of the same material as is the hooks 1016. The strip fastener material formed at the nip 1006 travels around the periphery of the cavity roller 1005 and around the stripping roller 1013, which assists in pulling the formed hook sheet from engagement with the cavity roll 1005. The strip is then passed to a wind-up roll, not shown.

A pre-formed sheet material 1030 is inserted into the nip 1006 to create the strip fastener tape. The sheet material bonds intimately with the unitary base 1010 composed of hook material to become an integral part of the structure of the strip fastener. A set of pins 1017 may help to carry the sheet material in a flat unwrinkled state. Other rollers and tensioning equipment 1019 are used to maintain the proper tension and flatness on the sheet material that will form the laminated substrate.

At the nip 1006, the sheet material 1030 is laminated to the hook material, as indicated by the small half-circles downstream of the nip. (The half-circles are not indicative of any circular structure. They are simply used to identify what is typically a flat sheet-like structure.)

Figure 10:
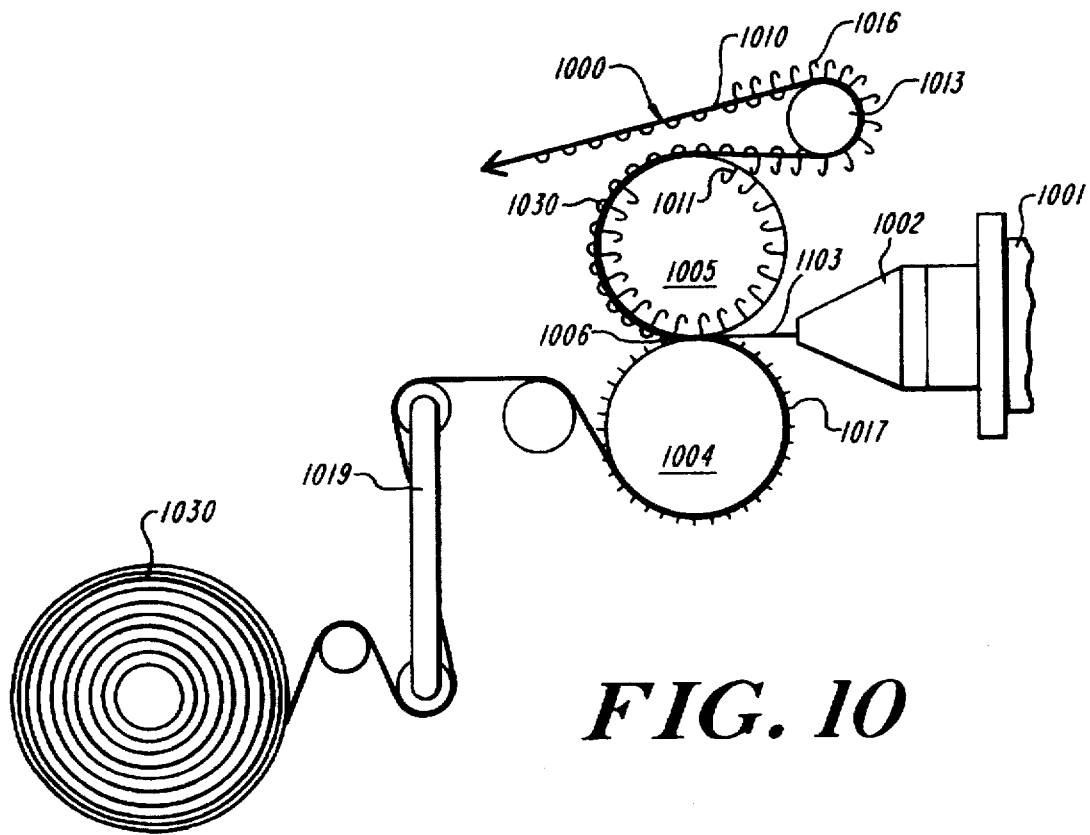
FIG. 10 shows schematically an apparatus and process for manufacturing an embodiment of the fastener component of the invention, having a unitary molded base carrying hooks on one surface thereof, which is further laminated with a substrate of a different material.

A fastener strip formed by the apparatus shown in FIG. 10 may also be represented schematically by FIG. 9. Again, the hooks 916 and a unitary, base 910 are laminated to the sheet material 930 forming a second substrate. A transition region 950 is composed of both the sheet material and the hook material.

There are many candidates for the sheet-like substrate material. The material may be woven or non-woven. It may constitute an open or a tight weave. It may be paper, with or without an adhesive backing, or may constitute a thin sheet of foam. It can also constitute the loop component of a normal hook and loop fastener pair. Any one of the foregoing may be useful to enhance the anchoring of the hook component into the article being molded. The type of sheet material substrate to which the hooks are laminated is not material to the invention. Any of these substrate backing materials may be composed of a substantial portion that is magnetically attractive. As such, the laminated backing material would be attracted to the magnet in the mold, and would achieve the goals of the invention.

The invention does not depend on the method by which the hook elements or the substrate are manufactured. All that is required is that one or the other or both can be treated with a magnetic attractant, such that it can be attracted by the magnet in the mold.

Rather than the "one-wrap" laminating method shown in FIG. 10, an off-line method can be used after the hook and base material is formed alone, such as shown in FIG. 7. Afterward, two rolled webs, one of hook carrying base material, the other of the substrate, can be laminated together. At the same time, a third web of a thin protective film can be applied to cover the hooks, to protect them against intrusion of molding material. The film can be secured to the hook carrying base, and/or substrate, depending on their relative widths, ultrasonically, or by heat and pressure, or adhesive.

Most of the foregoing discussion has focused on the hooks being molded. However, this too is not required for the practice of the invention. For instance, U.S. Pat. No. 2,717,437, issued in 1955 to George DeMestral, entitled VELVET TYPE FABRIC AND METHOD OF PRODUCING SAME discloses a hook component, which is entirely woven, from weft and warp threads and auxiliary warp threads. The auxiliary warp threads are formed into loops, which are cut, to form hooks. Typically, the auxiliary warp threads are made from a monofilament plastic resin. This plastic resin can be composed of the magnetic attractant, as discussed above. With such products, the hook material may also be referred to as "pile yarn" and the weft and warp threads, which compose the structure that serves as the base, are referred to as the ground yarns, or fabric.

While the foregoing has focused on a plastic matrix material as one constituent for either the hooks or the substrate, with a magnetic attractant filler generally therethrough as another constituent, other mechanical forms of magnetically attractive articles are possible and within the contemplation of the invention. For instance, either the hooks or the substrate can comprise a magnetically attractive core material, which is coated with or sheathed by a magnetically inert (non-attractive) material. Conversely, the articles can comprise a magnetically inert material, coated with a magnetically attractive material. All that is required is that at least one of the fastening elements or the substrate comprise a magnetically inert material that is in some fashion intimately associated or treated with a magnetically attractive material.

Figure 11:
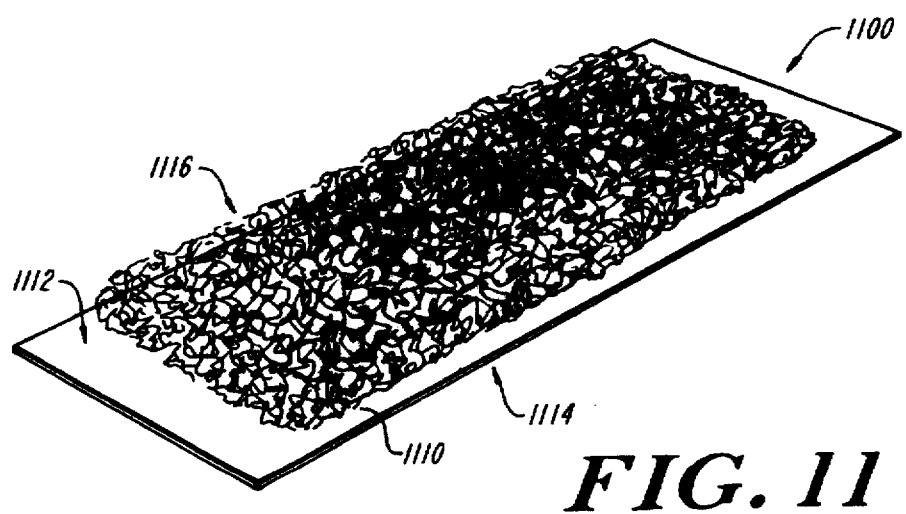
FIG. 11 shows schematically an embodiment of the invention, having a magnetically attractive loop carrying fastener component.

The foregoing discussion has generally considered that the fastening component to be incorporated into the mold be the hook carrying component. Although this is typical, it need not be the case. Therefore, the loop carrying component can alternatively be the portion of the fastener that is embedded in the molded article. In such case, as shown in FIG. 11, the loop carrying component 1100 will be the component that will include the magnetically attractive material. All of the discussion above applies to this embodiment also. The loops 1116 may be made from a plastic resin impregnated with a magnetically attractive powder, or any other suitable magnetically attractive form.

Thus, the invention accomplishes many goals. It provides a magnetically attractive fastening component, without a stiff, unwieldy, costly, heavy, possibly dangerous metal shim. Production times are kept low, because the magnetic attractant need not be added as a separate step after the hooks (or loops) are made, being provided at the time the hooks are made, in the normal way that the hooks are made. The fastening elements, such as the hooks, perform the dual functions of containing the magnetic attractant, and fastening to the mating element. Waste is minimized. No off-line steps are required to incorporate or remove the element containing the magnetic attractant. There are no problems of incompatible thermal properties engendered by the magnetically attractive material.

The foregoing discussion should be understood as illustrative and should not be considered to be limiting in any sense. While this invention has been particularly shown and described with references to preferred embodiments thereof, it will be understood by those skilled in the art that various changes in form and details may be made therein without departing from the spirit and scope of the invention as defined by the claims.

Having described the invention, what is claimed is:

1. A component of a two component separable hook and loop fastener, said component for use with a loop fastener comprising:
   a. a base, having a fastening surface and a non-fastening surface and comprising a magnetically inert constituent that is intimately associated with a magnetic attractant constituent, substantially throughout the entire volume of said base; and
   b. extending from said fastening surface of said base and directly attached thereto, a plurality of hook fastening elements comprising a magnetically inert constituent that is intimately associated with a magnetic attractant.

2. A component of a two component separable hook and loop fastener, said component for use with a loop fastener comprising:
   a. a base, having a fastening surface and non-fastening surface and comprising a magnetically inert constituent that is intimately associated with magnetic attractant constituent, substantially throughout the entire volume of said base; and b. extending from said fastening surface of said base and directly attached thereto, a plurality of hook fastening elements;

said base and said fastening elements comprising the same constitutive materials.

3. A component of a two component separable hook and loop fastener, said component for use with a loop fastener comprising:
   a. a base, having a fastening surface and a non-fastening surface and comprising a magnetically inert constituent that is intimately associated with a magnetic attractant constituent, substantially throughout the entire volume of said base; and
   b. extending from said fastening surface of said base and directly attached thereto, a plurality of hook fastening elements;

said fastening elements and said base being formed unitarily from the same precursor element.

4. A component of a two component separable hook and loop fastener, said component for use with a loop fastener comprising:
   a. a base, comprising a magnetically inert constituent that is intimately associated with a magnetic attractant constituent, substantially throughout the entire volume of said base and having a fastening surface and a non-fastening surface; and
   b. extending from said fastening surface of said base and directly attached thereto, a plurality of hook fastening elements; and
   c. a substrate that is formed from a precursor element that is separate from said base, and that is joined to said base.

5. The component of claim 4, said fastening elements and said substrate being coextruded.

6. The component of claim 4, said substrate and said fastening elements being laminated together.

7. The component of claim 6, said substrate comprising a woven material.

8. The component of claim 6, said substrate comprising a non-woven material.

9. The component of claim 6, said substrate comprising paper.

10. The component of claim 6, said substrate comprising foam.

11. The component of claim 4, said substrate comprising a magnetic attractant.

12. A molded article comprising:
    a. a body molded from a molding material, said body having at least one surface and an interior body region;
    b. fixed to said surface of said molded body, a separable hook fastener component for use with a complementary separable loop fastener component, said separable fastener component comprising:
       i. a base, having a fastening surface and a non-fastening surface; and
       ii. extending away from said fastening surface of said base and directly attached thereto and extending away from said surface of said molded body, a plurality of hook fastening elements for use with a loop fastener;

said base comprising a magnetically inert constituent that is intimately associated with a magnetic attractant constituent, substantially throughout the entire volume of said base.

13. The molded article of claim 12, said magnetically inert constituent comprising a polymeric plastic.

14. The molded article of claim 13, said plastic comprising a thermo plastic.

15. The molded article of claim 13, said plastic comprising a thermoplastic elastomer.

16. The molded article of claim 13, said polymeric plastic selected from the group consisting of:

polypropylene, polyethylene, polyamide, polyester, polystyrene, polyvinyl chloride, acetal, acrylic, polycarbonate, polyphenylene oxide, polyurethane, polysulfone and thermoplastic elastomers.

17. The molded article of claim 12, said magnetic attractant comprising a ferro-magnetic material.

18. The molded article of claim 12, said magnetic attractant being selected from the group consisting of iron powder, magnetite iron oxide, hematite iron oxide, iron (II) oxide, iron (III) oxide, iron (III) stearate.

19. The molded article of claim 12, said magnetic attractant comprising an organo-iron compound.

20. The molded article of claim 12 said magnetic attractant comprising a rare earth metal.

21. The molded article of claim 12, said fastening elements comprising a magnetically inert constituent that is intimately associated with a magnetic attractant.

22. The molded article of claim 12, further comprising a substrate that is joined to said base.

23. A component of a two component separable hook and loop fastener, said component comprising:
    a. a base, having a fastening surface and a non-fastening surface; and
    b. extending from said fastening surface of said base and directly attached thereto, a plurality of fastening elements, selected from the group consisting of hook elements for use with a loop fastener and loop elements;

both said base and said fastening elements comprising a magnetically inert constituent that is intimately associated with a magnetic attractant constituent.

24. The component of claim 23, said base and said fastening elements comprising a magnetically inert constituent that is intimately associated with a magnetic attractant constituent, substantially throughout the entire volume of said base and said fastening elements.

25. The component of claim 23, said base and said fastening elements comprising a magnetically inert constituent that is intimately associated with a magnetic attractant constituent, whereby one of said magnetically inert constituent and said magnetic attractant constituent comprises a core that is coated by the other of said magnetically inert constituent and said magnetic attractant constituent.

26. The component of claim 25, said magnetic attractant constituent comprising a core that is coated by said magnetically inert constituent.

27. The component of claim 25, said magnetically inert constituent comprising a core that is coated by said magnetic attractant constituent.

28. A molded article comprising:
    a. a body molded from a molding material, said body having at least one surface and an interior body region;
    b. fixed to said surface of said molded body, a separable hook and loop fastener component for use with a complementary separable fastener component, said separable fastener component comprising:
       i. a base, having a fastening surface and a non-fastening surface; and ii. extending away from said fastening surface of said base and directly attached thereto and extending away from said surface of said molded body, a plurality of fastening elements, selected from the group consisting of hook elements for use with a loop fastener and loop elements;

both said base and said plurality of fastening elements comprising a magnetically inert constituent that is intimately associated with a magnetic attractant constituent.

29. The molded article of claim 28, said base and said fastening elements comprising a magnetically inert constituent that is intimately associated with a magnetic attractant constituent, substantially throughout the entire volume of said base and said fastening elements.

30. The molded article of claim 28, said base and said fastening elements comprising a magnetically inert constituent that is intimately associated with a magnetic attractant constituent, whereby one of said magnetically inert constituent and said magnetic attractant constituent comprises a core that is coated by the other of said magnetically inert constituent and said magnetic attractant constituent.

31. The molded article of claim 30, said magnetic attractant constituent comprising a core that is coated by said magnetically inert constituent.

32. The molded article of claim 30, said magnetically inert constituent comprising a core that is coated by said magnetic attractant constituent.

* * * * *